United States Patent
Lewis et al.

(10) Patent No.: US 10,259,592 B2
(45) Date of Patent: Apr. 16, 2019

(54) AIRCRAFT RECEPTACLE

(71) Applicant: The Boeing Company, Chicago, IL (US)

(72) Inventors: Brian Lewis, Seattle, WA (US); Paul William Klenke, Seattle, WA (US); Dennis P. Byrne, Poulsbo, WA (US); Ky Huu Nguyen, Garden Grove, CA (US); Paul Gerard Weber, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 994 days.

(21) Appl. No.: 14/635,657

(22) Filed: Mar. 2, 2015

(65) Prior Publication Data

US 2017/0029133 A1 Feb. 2, 2017

(51) Int. Cl.
*B64D 39/06* (2006.01)
*B64D 37/16* (2006.01)
*B64F 5/40* (2017.01)

(52) U.S. Cl.
CPC ............. *B64D 39/06* (2013.01); *B64D 37/16* (2013.01); *B64F 5/40* (2017.01)

(58) Field of Classification Search
CPC ...... B64D 37/005; B64D 37/16; B64D 39/00; B64D 39/06; B64D 39/04; B64F 5/40
See application file for complete search history.

(56) References Cited

U.S. PATENT DOCUMENTS

| | | | | |
|---|---|---|---|---|
| 2,777,463 A | * | 1/1957 | Boswell | B64D 37/005 137/341 |
| 3,391,817 A | * | 7/1968 | Shaw | B64D 37/005 220/246 |
| 3,976,100 A | * | 8/1976 | Souslin | B64D 39/06 137/599.01 |
| 4,126,162 A | * | 11/1978 | Clark | B64D 39/06 141/231 |
| 4,282,909 A | * | 8/1981 | Clark | B64D 39/06 141/231 |
| 2011/0079320 A1 | * | 4/2011 | Mitrovich | B60K 15/04 141/198 |
| 2017/0029133 A1 | * | 2/2017 | Lewis | B64D 39/06 |

* cited by examiner

*Primary Examiner* — Medhat Badawi
*Assistant Examiner* — Christopher D Hutchens
(74) *Attorney, Agent, or Firm* — Yee & Associates, P.C.

(57) ABSTRACT

A system and method for an aircraft refueling receptacle. The aircraft refueling receptacle comprises a pedestal, a flanged structure, a sliding valve, and a bolt. The flanged structure has a first ledge, a second ledge, and a number of flanges extending inwardly. The pedestal contacts the first ledge. The sliding valve has a first face that contacts the second ledge of the flanged structure during refueling. The bolt extends a part of a length of the pedestal and is connected to a receiver within the pedestal.

17 Claims, 10 Drawing Sheets

AIRCRAFT RECEPTACLE

GOVERNMENT LICENSE RIGHTS

This application was made with United States Government support under contract number FA8625-11-C-6600 with PA 3349 for the BCA/BDS 767 awarded by the United States Department of Defense. The United States Government has certain rights in this application.

BACKGROUND INFORMATION

1. Field

The present disclosure relates generally to aircraft receptacles. The present disclosure relates more particularly to methods and apparatuses for aerial refueling. Still more particularly, the present disclosure relates to a refueling receptacle.

2. Background

An aircraft in flight may be refueled from a refueling aircraft. Many refueling aircraft use a system of fixed and extendable tubing, often referred to as a refueling boom, for refueling a receiving aircraft. A distal end of the refueling boom may be extendable to allow the operator to extend the refueling boom into engagement with the refueling receptacle.

The refueling receptacle of the receiving aircraft accepts the distal end of the refueling boom. The distal end of the refueling boom is inserted into a boom cavity of the refueling receptacle. The distal end of the refueling boom may open a flow path in the refueling receptacle. The flow path may influence the speed of refueling. A variety of aspects of the refueling receptacle may undesirably impact the flow rate during refueling. Reducing the flow rate during refueling may increase the time for refueling. Increasing aerial refueling time may increase the risk to the aircraft and operators.

Therefore, it would be desirable to have a method and apparatus that take into account at least some of the issues discussed above, as well as other possible issues.

SUMMARY

An illustrative embodiment of the present disclosure provides an aircraft refueling receptacle. The aircraft refueling receptacle comprises a pedestal, a flanged structure, a sliding valve, and a bolt. The flanged structure has a first ledge, a second ledge, and a number of flanges extending inwardly. The pedestal contacts the first ledge. The sliding valve has a first face that contacts the second ledge of the flanged structure during refueling. The bolt extends a part of a length of the pedestal and is connected to a receiver within the pedestal.

Another illustrative embodiment of the present disclosure provides an aircraft refueling receptacle. The aircraft refueling receptacle comprises a pedestal, a flanged structure, and a sliding valve. The pedestal has a desired profile such that the aircraft refueling receptacle does not require adjustment following maintenance. The flanged structure has a first ledge, a second ledge, and a number of flanges extending inwardly. The pedestal contacts the first ledge. The sliding valve has a first face that contacts the second ledge of the flanged structure during refueling.

A further illustrative embodiment of the present disclosure provides an aircraft refueling receptacle. The aircraft refueling receptacle comprises a pedestal, a flanged structure, a sliding valve, and a bolt. The pedestal has a first substantially planar end. The flanged structure has a second substantially planar end, a ledge, and a number of flanges extending inwardly. The first substantially planar end of the pedestal contacts the second substantially planar end. The sliding valve is associated with a seal. The sliding valve has a first face that contacts the ledge of the flanged structure during refueling. The seal associated with the sliding valve has a recessed design such that the seal does not undesirably influence refueling flow. The bolt extends a part of a length of the pedestal and connects to a receiver within the pedestal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that a refueling receptacle may be a complex system including a plurality of parts. Performing maintenance on the receptacle may be more difficult or time-consuming than desired. The illustrative embodiments recognize and take into account that the entirety of the refueling receptacle may be removed from the aircraft to perform maintenance. The illustrative embodiments recognize and take into account that the entirety of the refueling receptacle may be removed from the aircraft to replace a component during maintenance. The illustrative embodiments recognize and take into account that at least one of maintenance time or maintenance cost may be reduced by not removing the entire refueling receptacle during maintenance.

The illustrative embodiments further recognize and take into account that refueling receptacles of the same design may have different flow capabilities. Further, the illustrative embodiments recognize that the same refueling receptacle may have a different flow capability following maintenance. In some illustrative examples, components of the refueling receptacles may change position following maintenance. The illustrative embodiments recognize and take into account that components of the refueling receptacle may change position as a result of over-tightening of components. By the components changing position, the flow path of the refueling receptacle may be altered.

The illustrative embodiments recognize and take into account that increasing the flow rate of a refueling receptacle may reduce the time to refuel. The illustrative embodiments also recognize and take into account that reducing the time to refuel may reduce the risk to at least one of the respective aircraft or operators.

Figure 1:
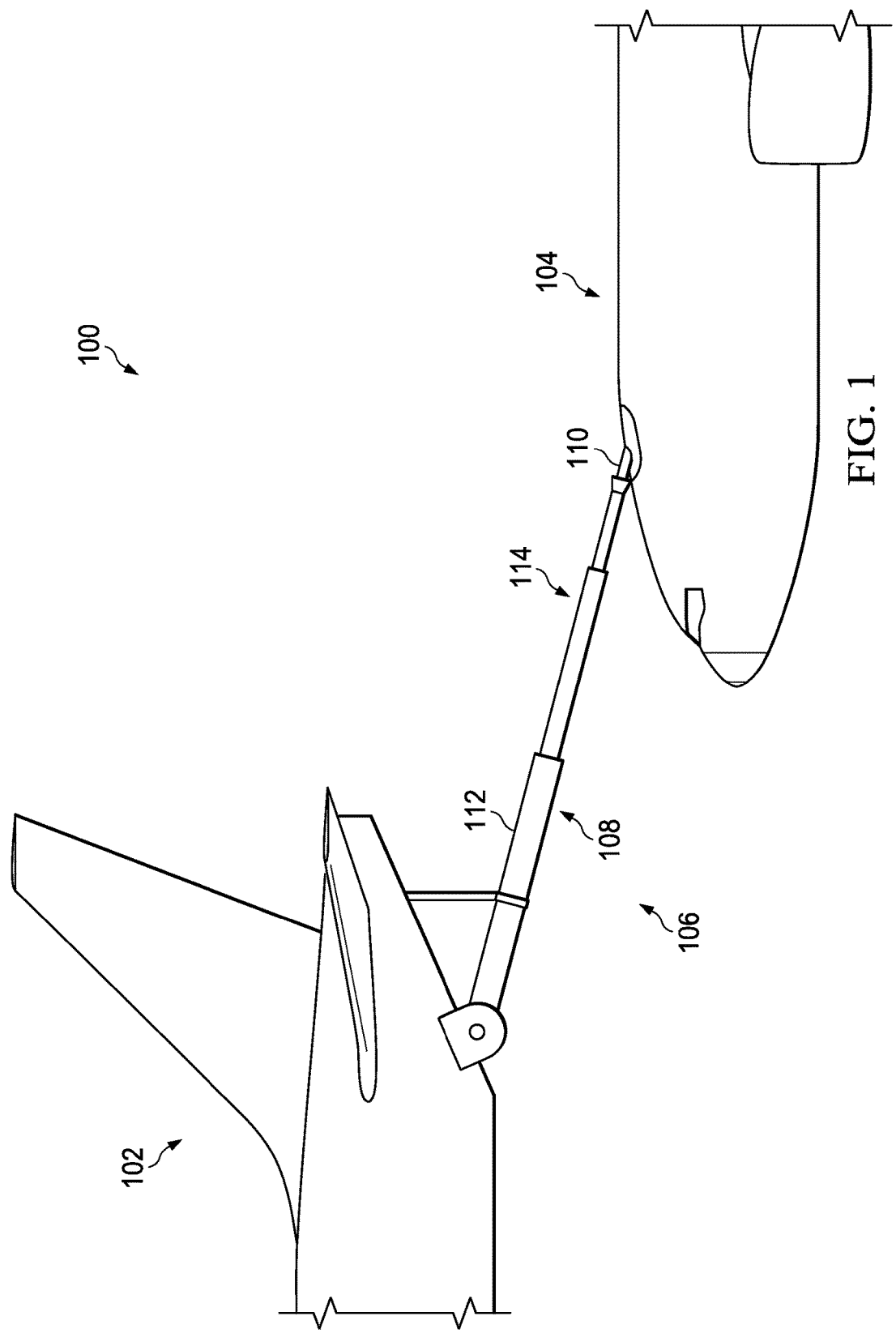
FIG. 1 is a diagrammatic representation of a side view of an aerial refueling environment in accordance with an illustrative embodiment.

With reference now to the figures, and in particular, with reference to FIG. 1, a diagrammatic representation of a side view of an aerial refueling environment is depicted in accordance with an illustrative embodiment. As depicted, aerial refueling environment 100 includes refueling aircraft 102 and receiving aircraft 104. Refueling aircraft 102 may also be referred to as a tanker. Refueling aircraft 102 is equipped with in-flight refueling assembly 106 that includes refueling boom 108. Refueling boom 108 is configured to be guided into alignment with refueling receptacle 110 of receiving aircraft 104. Refueling boom 108 includes base portion 112 and extendable portion 114 that may be extended into engagement with refueling receptacle 110, fluidly coupling refueling aircraft 102 and receiving aircraft 104.

This diagrammatic representation of aerial refueling environment 100 is provided for purposes of illustrating one environment in which the different illustrative embodiments may be implemented. The diagrammatic representation of aerial refueling environment 100 in FIG. 1 is not meant to imply architectural limitations as to the manner in which different illustrative embodiments may be implemented. For example, receiving aircraft 104 is shown as a tanker aircraft. The different illustrative embodiments may be applied to other types of aircraft, such as private passenger aircraft, military aircraft, and other suitable types of aircraft equipped to receive fuel while in flight.

Figure 2:
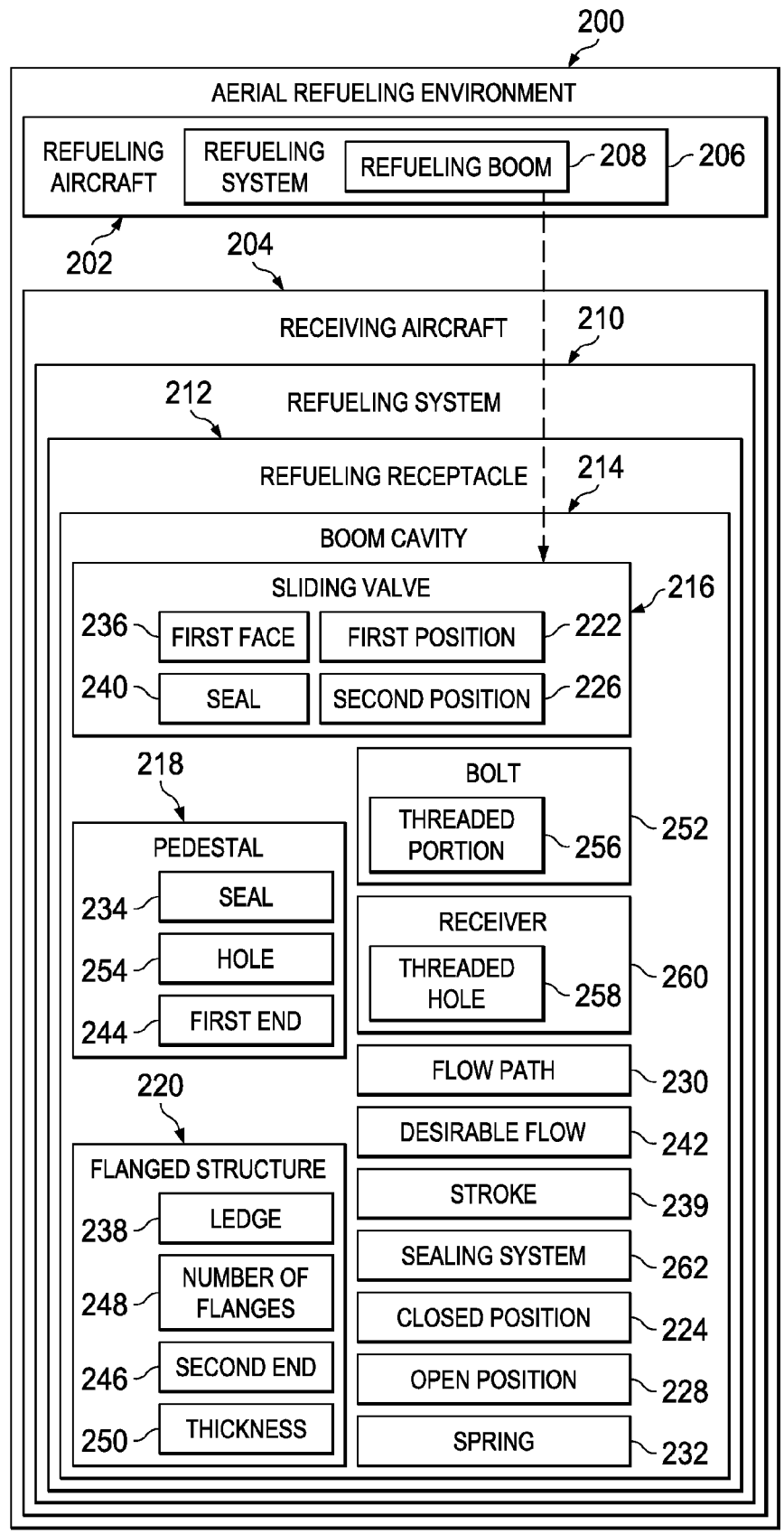
FIG. 2 is a block diagram of an aerial refueling environment in accordance with an illustrative embodiment.

Turning now to FIG. 2, a block diagram of an aerial refueling environment is depicted in accordance with an illustrative embodiment. Aerial refueling environment 100 of FIG. 1 may be a physical implementation of aerial refueling environment 200.

As depicted, aerial refueling environment 200 includes refueling aircraft 202 and receiving aircraft 204. Refueling aircraft 202 has refueling system 206 including refueling boom 208. To refuel receiving aircraft 204, refueling boom 208 is extended from refueling aircraft 202 to refueling system 210 of receiving aircraft 204. Refueling boom 208 is aligned with refueling receptacle 212. Refueling boom 208 is inserted into boom cavity 214 of refueling receptacle 212. When refueling boom 208 is inserted into boom cavity 214, a distal end of refueling boom 208 may contact sliding valve 216. Refueling boom 208 may move sliding valve 216 relative to pedestal 218 and flanged structure 220. Prior to refueling boom 208 being inserted into boom cavity 214, sliding valve 216 may be in first position 222 such that refueling receptacle 212 is in closed position 224. Refueling boom 208 may move sliding valve 216 to second position 226 such that refueling receptacle 212 is in open position 228. When refueling receptacle 212 is in open position 228, fuel may flow from refueling boom 208 into flow path 230.

Spring 232 may bias sliding valve 216 in first position 222 when refueling boom 208 is not present. In first position 222, sliding valve 216 may contact seal 234 associated with pedestal 218.

When sliding valve 216 is in second position 226, first face 236 of sliding valve 216 may contact ledge 238 of flanged structure 220. First face 236 and ledge 238 may limit the distance which sliding valve 216 may travel. In some illustrative examples, ledge 238 may be called a second ledge.

The distance between first position 222 and second position 226 may be referred to as stroke 239. Stroke 239 may be a distance sliding valve 216 travels.

Sliding valve 216 may be associated with seal 240. Seal 240 may substantially prevent fuel from contacting some components of refueling receptacle 212. For example, seal 240 may substantially prevent fuel from interacting with spring 232. Seal 240 may have a shape such that seal 240 does not undesirably influence the flow of fuel through flow path 230. In some illustrative examples, seal 240 may have a recessed design such that seal 240 does not undesirably influence the refueling flow.

Desirable flow 242 may include at least one of a desirable flow rate and a desirable flow turbulence. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

In one illustrative example, desirable flow 242 may include a flow rate of at least 1,200 gallons of fuel per minute. In another illustrative example, desirable flow 242 is a substantially constant flow each time refueling receptacle 212 is used.

Pedestal 218 may be designed such that refueling receptacle 212 may have desirable flow 242. Pedestal 218 may have first end 244. First end 244 may contact second end 246 of flanged structure 220. In some illustrative examples, first end 244 may be substantially planar. As a result, in these illustrative examples, first end 244 may be referred to as a first substantially planar end. In some illustrative examples, second end 246 may be substantially planar. As a result, in these illustrative examples, second end 246 may be referred to as a second substantially planar end. As a result of first end 244 contacting second end 246, pedestal 218 may be constantly positioned in substantially the same position relative to flanged structure 220. In some illustrative examples second end 246 may instead be called a first ledge of flanged structure 220.

During maintenance, pedestal 218 may be removed from refueling receptacle 212. When pedestal 218 has a substantially constant position relative to flanged structure 220, refueling receptacle 212 may not require adjustment following maintenance.

When pedestal 218 has a substantially constant position relative to flanged structure 220, flow path 230 may have substantially the same shape and substantially the same size throughout the life of refueling receptacle 212. When flow path 230 has substantially the same shape and substantially the same size throughout the life of refueling receptacle 212, refueling receptacle 212 has substantially the same flow rate throughout the life of refueling receptacle 212. By having a substantially constant position of pedestal 218, refueling receptacle 212 may have a substantially constant stroke.

Further, other refueling receptacles having the same design as refueling receptacle 212 may have the same stroke as refueling receptacle 212. As a result, it may be said that refueling receptacle 212 has a consistent stroke with other refueling receptacles of the same design.

Flanged structure 220 may have number of flanges 248. A flange of number of flanges 248 may connect and support other portions of flanged structure 220. For example, a flange of number of flanges 248 may act as a rib between other portions of flanged structure 220.

Flanged structure 220 may position pedestal 218 within refueling receptacle 212. A flange of number of flanges 248 of flanged structure 220 may center pedestal 218 within refueling receptacle 212. For example, a portion of pedestal 218 may slip over a flange of number of flanges 248. Flanged structure 220 may also guide sliding valve 216. A flange of number of flanges 248 may form a channel within which a portion of sliding valve 216 may move. Flanged structure 220 may have thickness 250. Thickness 250 may be selected to provide desirable flow 242.

Bolt 252 may secure pedestal 218 within refueling receptacle 212. Bolt 252 may extend through hole 254 of pedestal 218. Bolt 252 may extend through a portion of pedestal 218. Threaded portion 256 of bolt 252 may interact with threaded hole 258 of receiver 260. Receiver 260 may extend through flanged structure 220 and a portion of pedestal 218. Receiver 260 may be configured to receive threaded portion 256 of bolt 252. In some illustrative examples, when installed, receiver 260 extends through flanged structure 220 and aportion of pedestal 218, receiver 260 having a cavity configured to receive threaded portion 256 of bolt 252 and a shaft extending through flanged structure 220, receiver 260 is configured to be held relative to flanged structure 220 using a fastener.

During maintenance, it may be desirable to replace or remove components of refueling receptacle 212. Some components may be replaced or removed through boom cavity 214. This may be referred to as a through-the-bore replacement. In this illustrative example, boom cavity 214 may be the "bore" in the through-the-bore replacement. To replace a component of refueling receptacle 212, bolt 252 may be removed. Thus, bolt 252 may be configured to provide through-the-bore replacement of at least one of a seal or a moving part of refueling receptacle 212 without removing refueling receptacle 212 from receiving aircraft 204. In some illustrative examples, the seal may be at least one of seal 234 or seal 240. In some illustrative examples, the moving part may be at least one of sliding valve 216 or spring 232.

Bolt 252 may allow for through-the-bore removal of components of refueling receptacle 212. For example, bolt 252 may allow for through-the-bore removal of at least one of seal 234, seal 240, or pedestal 218. Bolt 252 may reduce at least one of manufacturing cost or manufacturing time.

Refueling receptacle 212 may include additional components. For example, refueling receptacle 212 may include sealing system 262. Sealing system 262 may include a number of seals. As used herein, "a number of," when used with reference to items, means one or more items.

In some illustrative examples, sealing system 262 may substantially prevent fuel from interacting with components of refueling receptacle 212. In some illustrative examples, sealing system 262 may substantially prevent fuel from undesirably leaking from refueling receptacle 212.

Figure 3:
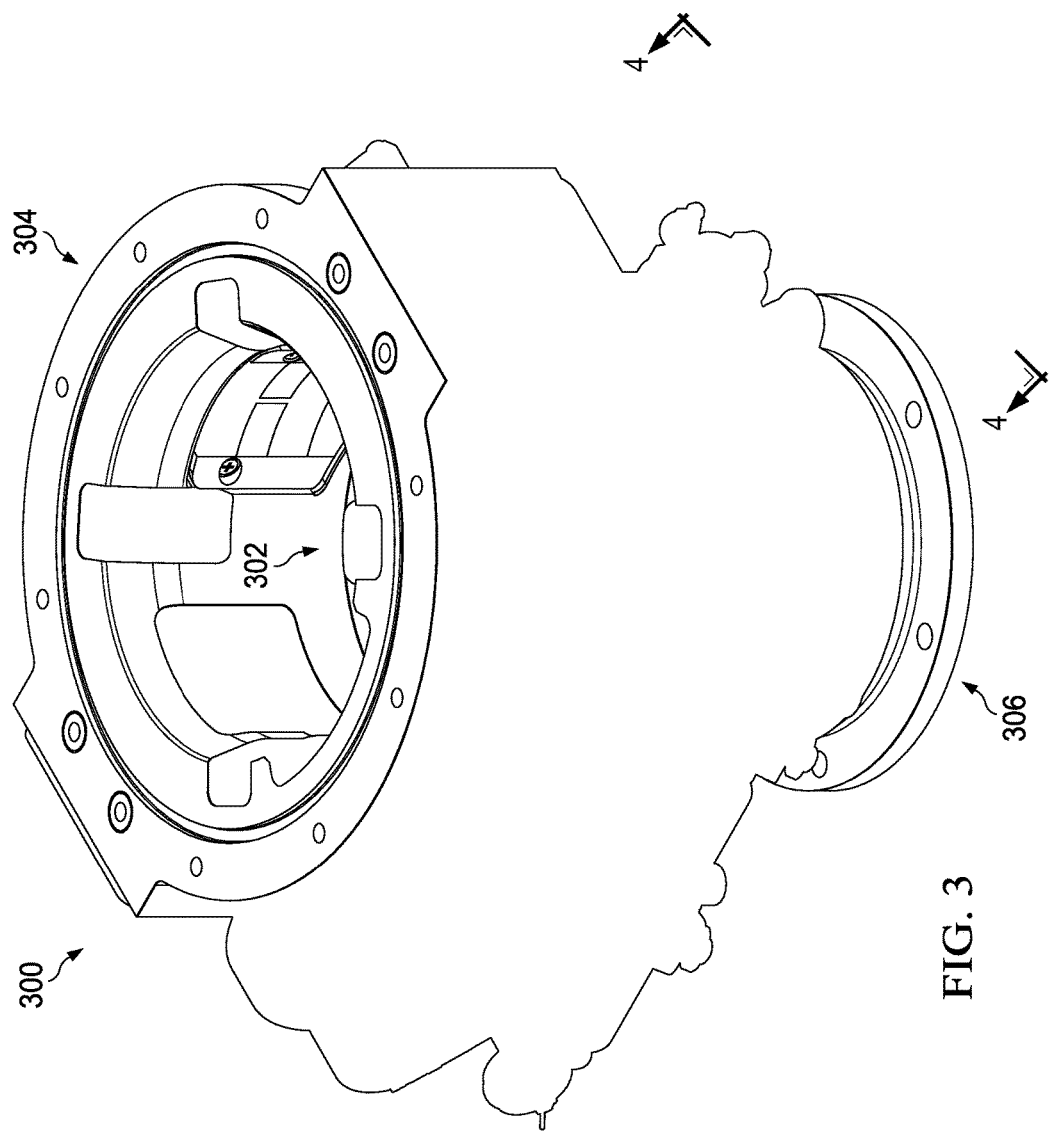
FIG. 3 is a diagrammatic representation of a front isometric view of a refueling receptacle in an aircraft in accordance with an illustrative embodiment.

Turning now to FIG. 3, a diagrammatic representation of a front isometric view of a refueling receptacle in an aircraft is depicted in accordance with an illustrative embodiment. Refueling receptacle 300 may be a physical implementation of refueling receptacle 212 of FIG. 2. Refueling receptacle 300 may be an implementation of refueling receptacle 110 of FIG. 1.

Refueling receptacle 300 has boom cavity 302 which may receive a refueling boom of a refueling aircraft. Boom cavity 302 may be at first end 304 of refueling receptacle 300. During refueling, fuel may flow from a refueling boom into refueling receptacle 300 and towards second end 306 of refueling receptacle 300.

Figure 4:
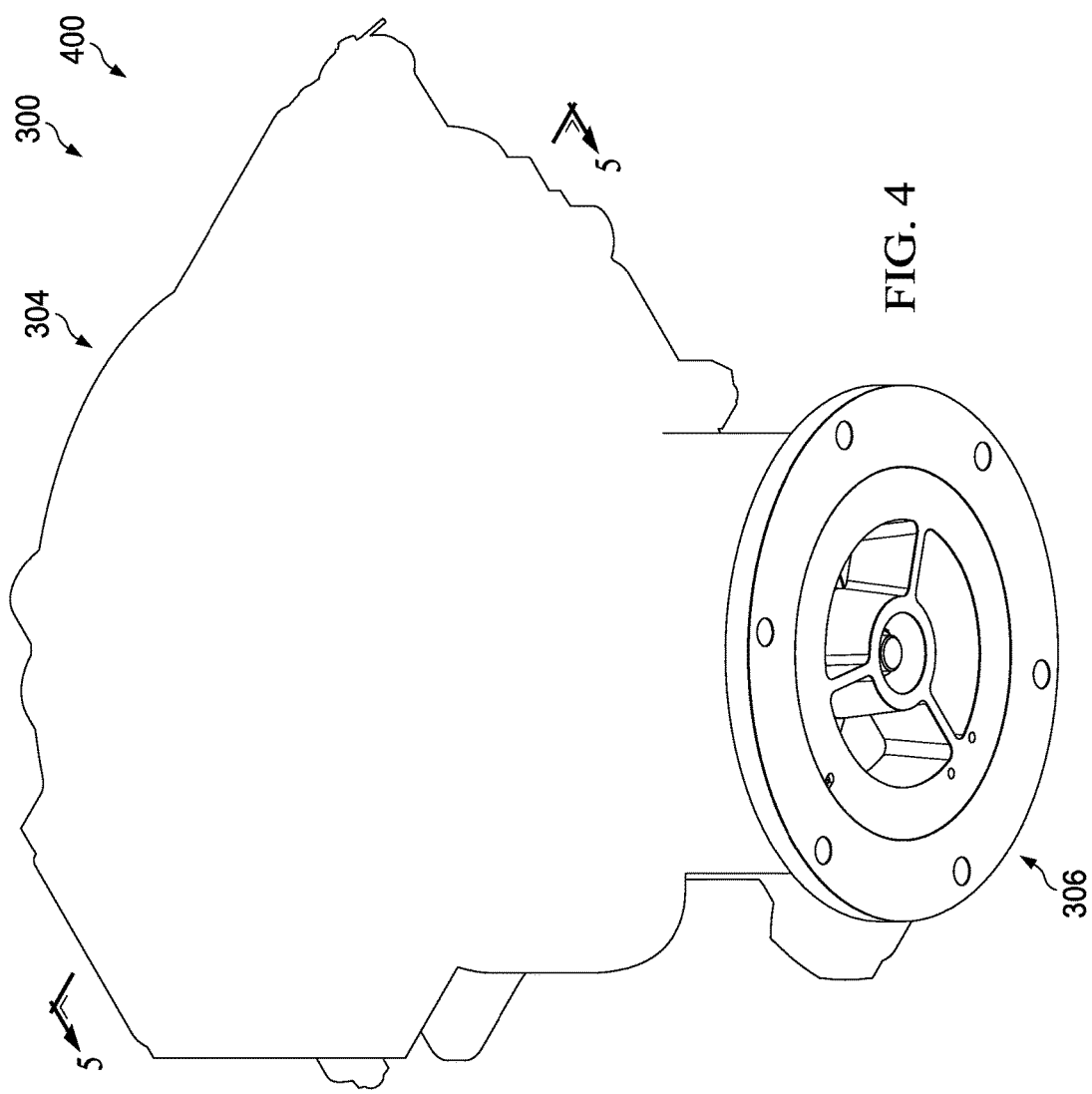
FIG. 4 is a diagrammatic representation of an isometric back view of a refueling receptacle in an aircraft in accordance with an illustrative embodiment.

Turning now to FIG. 4, a diagrammatic representation of an isometric back view of a refueling receptacle in an aircraft is depicted in accordance with an illustrative embodiment. View 400 may be a view of refueling receptacle 300 from direction 4-4 of FIG. 3.

Figure 5:
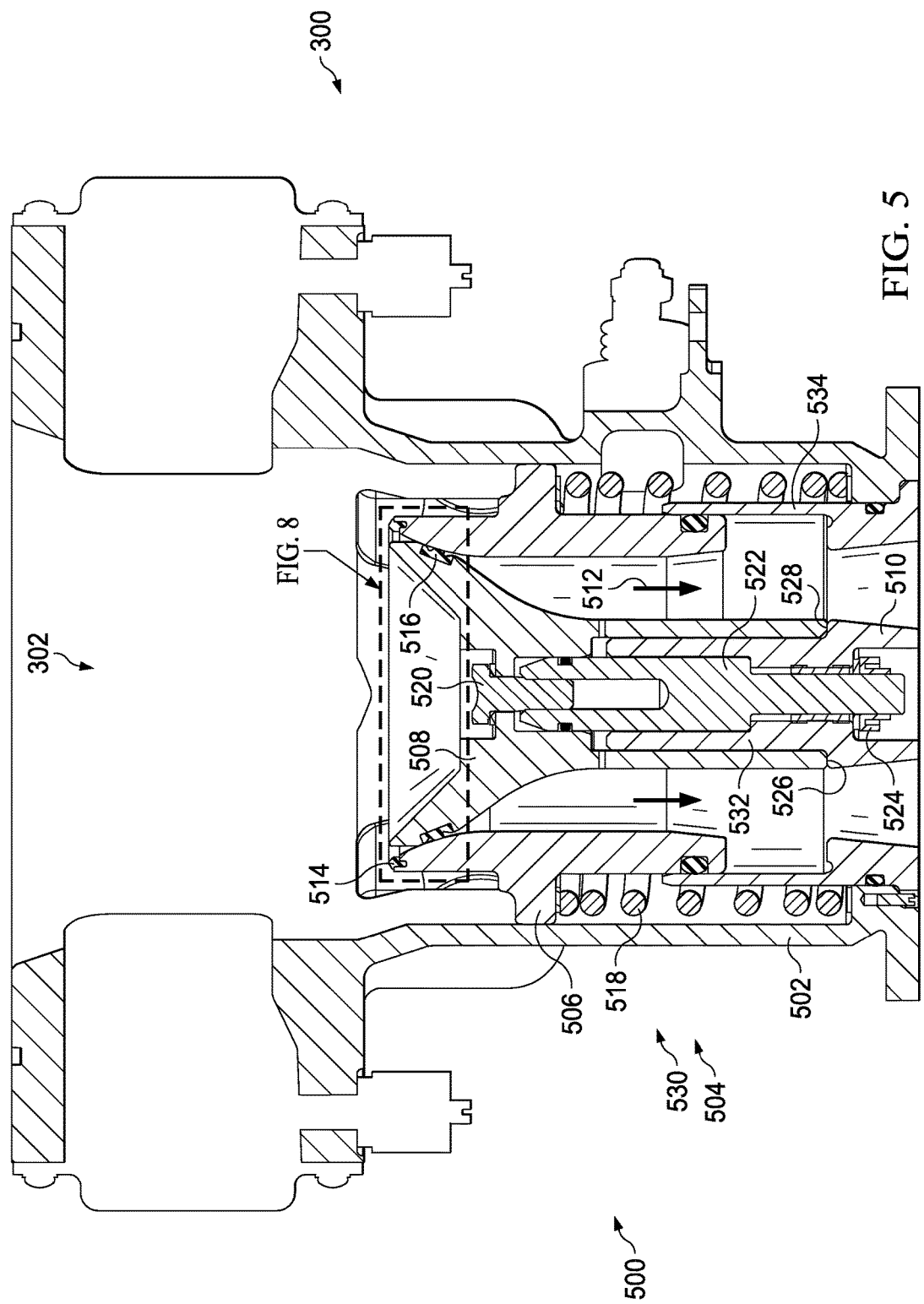
FIG. 5 is a diagrammatic representation of a cross-sectional view of a refueling receptacle in accordance with an illustrative embodiment.

Turning now to FIG. 5, a diagrammatic representation of a cross-sectional view of a refueling receptacle is depicted in accordance with an illustrative embodiment. View 500 may be a view of refueling receptacle 300 from along cross-section 5-5 of FIG. 4.

Refueling receptacle 300 may have housing 502 encompassing the internal components. Refueling receptacle 300 is depicted in closed position 504. The internal components may include sliding valve 506, pedestal 508, and flanged structure 510 which may form flow path 512.

The shape of flow path 512 may be influenced by at least one of sliding valve 506, pedestal 508, flanged structure 510, seal 514, and seal 516. The shape of flow path 512 may influence the fluid dynamics of flow path 512. For example, the shape of flow path 512 may influence at least one of the rate of flow or the turbulence of flow of fuel traveling through flow path 512. The speed at which fuel may travel through flow path 512 may be influenced by at least one of sliding valve 506, pedestal 508, flanged structure 510, seal 514, and seal 516. Seal 514 is associated with sliding valve 506. As one example, the shape of seal 514 may influence the speed at which fuel travels through flow path 512. Seal 516 is associated with pedestal 508. As another example, the shape of seal 516 may influence the speed at which fuel travels through flow path 512.

The shape of pedestal 508 may be selected based on desired flow behavior through flow path 512. The shape of flanged structure 510 may be selected based on desired flow behavior through flow path 512.

As depicted, spring 518 may bias sliding valve 506 towards boom cavity 302. Spring 518 may bias sliding valve 506 against seal 516. Spring 518 may hold refueling receptacle 300 in closed position 504 when a refueling boom is not present.

During maintenance, it may be desirable to replace or remove components of refueling receptacle 300. Some components may be replaced or removed through boom cavity 302. This may be referred to as a through-the-bore replacement. To replace a component of refueling receptacle 300, bolt 520 may be removed. Thus, bolt 520 may be configured to provide through-the-bore replacement of at least one of a seal or a moving part of refueling receptacle 300 without removing refueling receptacle 300 from the aircraft. In some illustrative examples, the seal may be at least one of seal 514 or seal 516. In some illustrative examples, the moving part may be at least one of sliding valve 506 or spring 518.

Bolt 520 may extend a part of the length of pedestal 508. Bolt 520 may be connected to receiver 522 in pedestal 508. Receiver 522 may extend through flanged structure 510 and a portion of pedestal 508. Receiver 522 may be configured to receive a threaded portion of bolt 520. As depicted, receiver 522 has a cavity configured to receive a treaded portion of bolt 520 and shaft extending through flanged structure 510. In view 500, bolt 520 is connected to the cavity of receiver 522 configured to receive a threaded portion of bolt 520. In view 500, the shaft of receiver 522 is depicted extending through flanged structure 510. Receiver 522 may be held relative to flanged structure 510 using fastener 524. In view 500, fastener 524 connects to the shaft of receiver 522.

During maintenance, pedestal 508 may be removed from housing 502 of refueling receptacle 300. Following maintenance, pedestal 508 may be placed back into refueling receptacle 300. To maintain the same position of pedestal 508 relative to housing 502 and flanged structure 510 prior to and following maintenance, pedestal 508 may have a desired profile. This desired profile may cause refueling receptacle 300 to not require adjustment following maintenance. Specifically, pedestal 508 may have first end 526. First end 526 is substantially planar. In some examples, first end 526 may be referred to as a first substantially planar end.

First end 526 may contact second end 528 of flanged structure 510. Second end 528 may also be substantially planar. In some examples, second end 528 may be referred to as a second substantially planar end. By first end 526 contacting second end 528, pedestal 508 is limited in its movement towards second end 306 of refueling receptacle 300 shown in FIG. 3. As a result, pedestal 508 may have a substantially constant position relative to flanged structure 510 following maintenance. In some illustrative examples second end 528 may instead be called a first ledge.

Even small changes in stroke may greatly affect flow performance. As a result, it is desirable to have a constant, repeatable stroke for refueling receptacle 300 as well as other refueling receptacles. By pedestal 508 having a substantially constant position relative to flanged structure 510, a stroke of refueling receptacle 300 may be substantially constant. Thus, refueling receptacle 300 may have a substantially constant stroke. The stroke of refueling receptacle 300 may be the distance traveled by sliding valve 506 when refueling receptacle is moved from closed position 504 to an open position.

Further, other refueling receptacles having the same design as refueling receptacle 300 may have the same stroke as refueling receptacle 300. As a result, it may be said that refueling receptacle 300 has a consistent stroke with other refueling receptacles of the same design. Flanged structure 510 also has number of flanges 530. As can be seen in view 500, flange 532 of number of flanges 530 may position pedestal 508 within refueling receptacle 300. As depicted, a portion of pedestal 508 may slip over flange 532 of number of flanges 530. Further, flange 534 of number of flanges 530 forms a channel within which a portion of sliding valve 506 may move.

Figure 6:
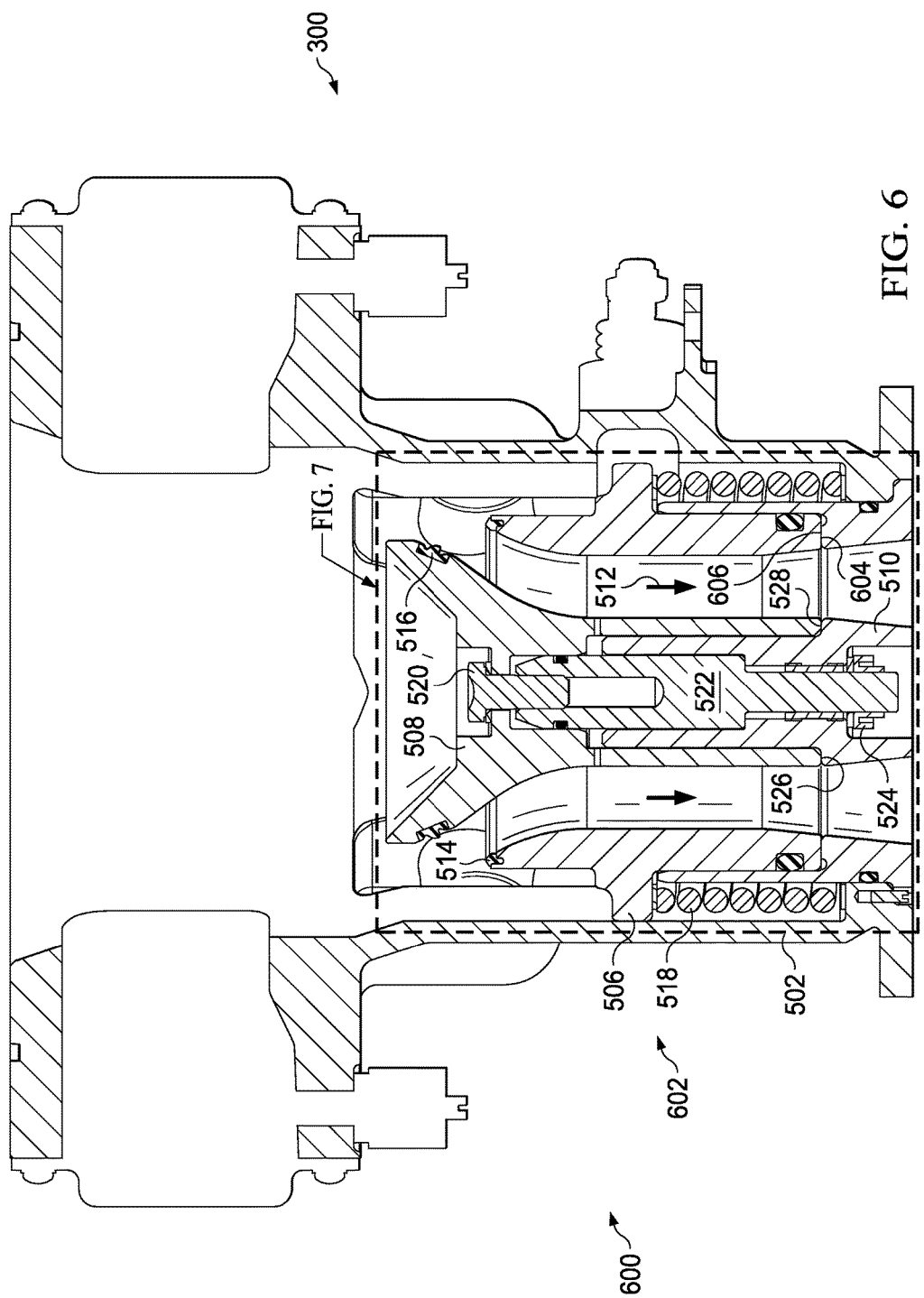
FIG. 6 is a diagrammatic representation of a cross-sectional view of a refueling receptacle in accordance with an illustrative embodiment.

Turning now to FIG. 6, a diagrammatic representation of a cross-sectional view of a refueling receptacle is depicted in accordance with an illustrative embodiment. View 600 may be a view of refueling receptacle 300 from along cross-section 5-5 of FIG. 4. View 600 is a cross-sectional view of refueling receptacle 300 in open position 602.

When refueling receptacle 300 is in open position 602, fuel may flow from a refueling boom through flow path 512. Flow path 512 may be formed of pedestal 508, sliding valve 506, and flanged structure 510. Flow path 512 may be designed such that fuel traveling through flow path 512 may have a desirable flow.

The flow may be impacted by any component the fuel encounters within refueling receptacle 300. For example, shape of pedestal 508 may impact the flow of fuel. Further, at least one of shape of seal 514, position of seal 514, shape of seal 516, or position of seal 516 may impact the flow of fuel.

As can be seen in view 600, seal 516 is conformal to the surface of pedestal 508. As a result, seal 516 does not undesirably extend into flow path 512. Thus, seal 516 does not undesirably affect the flow of fuel through refueling receptacle 300.

Seal 514 may also be designed so that seal 514 does not undesirably affect flow of fuel through refueling receptacle 300. Seal 514 may seal the opening between pedestal 508 and sliding valve 506 while in the closed position.

As can be seen in view 600, first face 604 of sliding valve 506 contacts second ledge 606 of flanged structure 510 during refueling. In some illustrative examples, first face 604 and second ledge 606 may be substantially planar. First face 604 may be a physical implementation of first face 236 of FIG. 2. Second ledge 606 may be an implementation of ledge 238 of FIG. 2.

Figure 7:
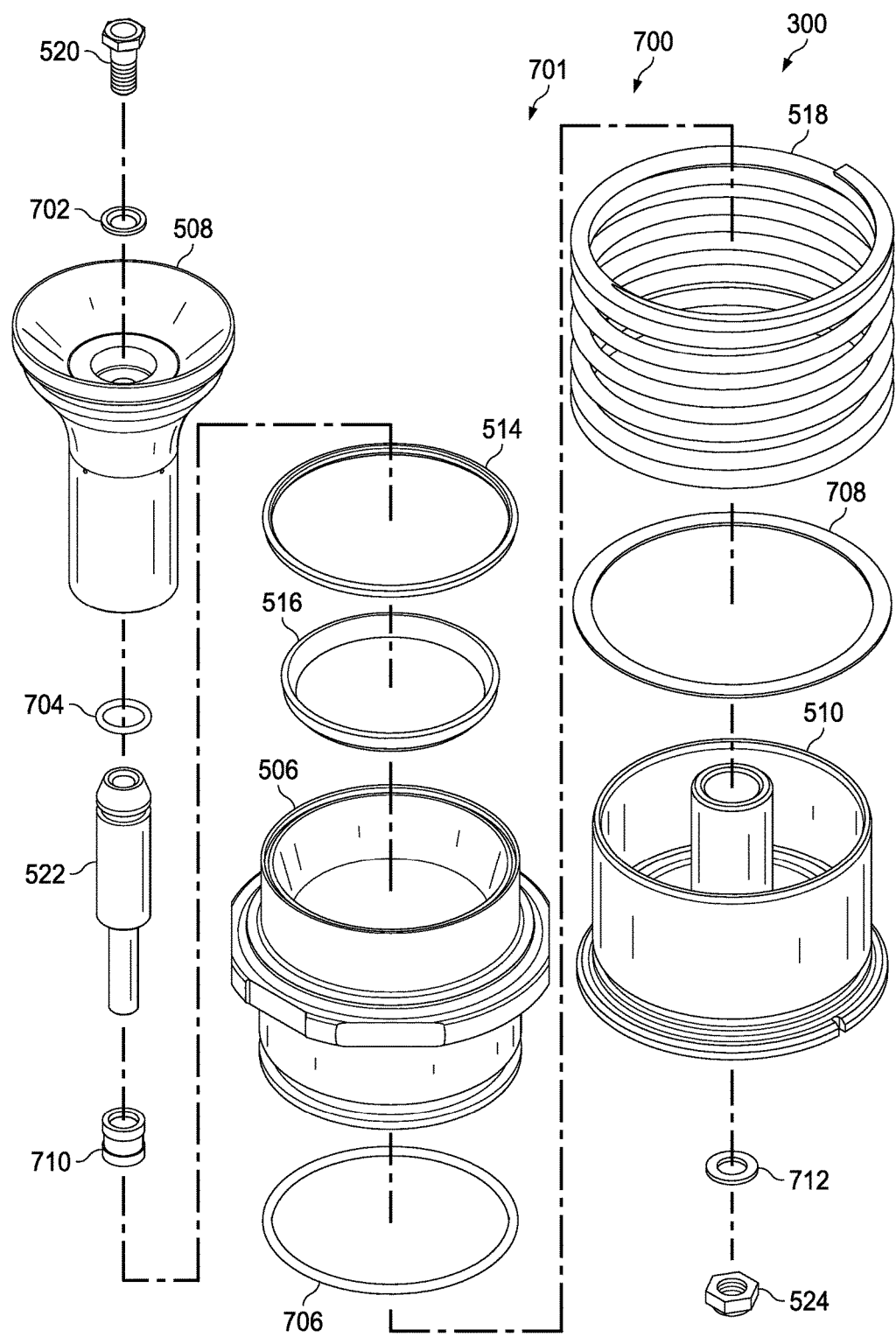
FIG. 7 is a diagrammatic representation of an exploded isometric view of a refueling receptacle in an aircraft in accordance with an illustrative embodiment.

Turning now to FIG. 7, a diagrammatic representation of an exploded isometric view of a refueling receptacle in an aircraft is depicted in accordance with an illustrative embodiment. View 700 may be an exploded view of the components of refueling receptacle 300 within the box labeled FIG. 7 shown in FIG. 6. In view 700, sealing system 701 may be more clearly seen. Sealing system 701 may be a physical implementation of sealing system 262 of FIG. 2. Sealing system 701 may maintain the fluid tightness of refueling receptacle 300. In some illustrative examples, a seal of sealing system 701 may be present between each component of refueling receptacle 300. Sealing system 701 may include seal 702, seal 704, seal 706, and seal 708.

In some illustrative examples, at least one of seal 702, seal 704, seal 706, and seal 708 may be replaced using through-the-bore replacement. Further, in some illustrative examples, any of the internal components of refueling receptacle 300 may be replaced using through-the-bore replacement if the internal component and any connections between the internal component and other components of the refueling receptacle 300 are accessible from first end 304 of refueling receptacle 300. However, if an internal component has a connection, such as a fastener, which is only accessible from second end 306 of refueling receptacle 300, it may not be replaceable using through-the-bore replacement. In these illustrative examples, boom cavity 302 may be the "bore" in the through-the-bore replacement.

Refueling receptacle 300 may also include threaded metal insert 710 and washer 712. In some illustrative examples, at least one of threaded metal insert 710 or washer 712 may not be replaceable using through-the-bore replacement. As depicted in FIGS. 5 and 6, when refueling receptacle 300 is assembled, the shaft of receiver 522 will extend through threaded metal insert 710.

Figure 8:
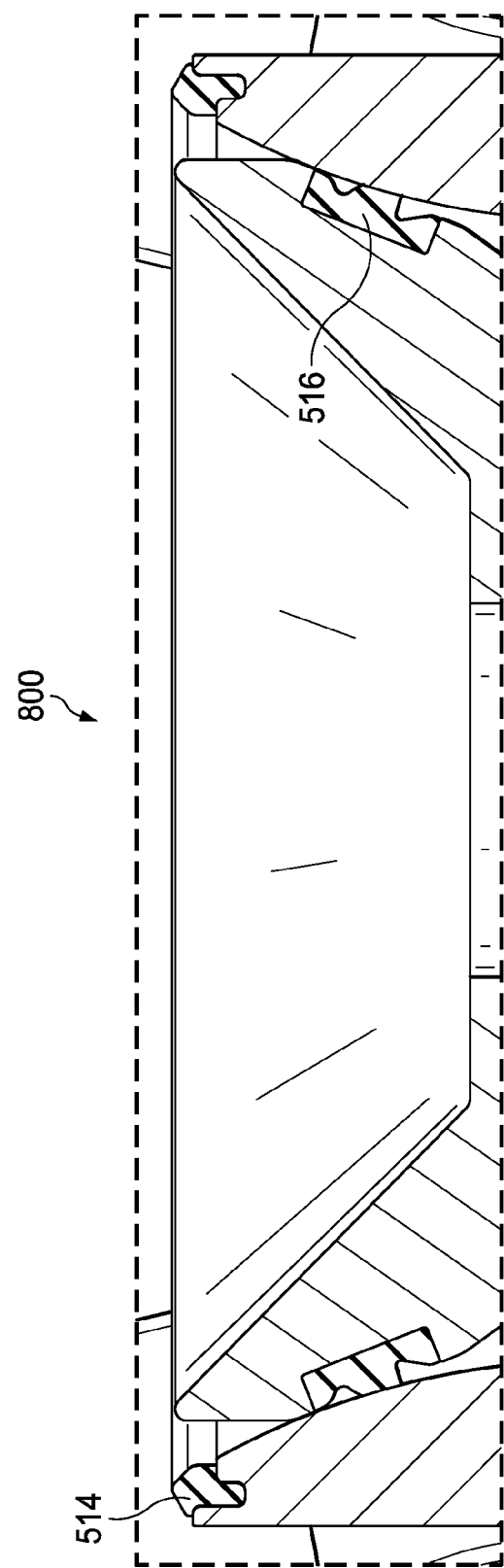
FIG. 8 is a diagrammatic representation of a cross-sectional view of a seal of a refueling receptacle in accordance with an illustrative embodiment.

Turning now to FIG. 8, a diagrammatic representation of a cross-sectional view of a seal of a refueling receptacle is depicted in accordance with an illustrative embodiment. View 800 may be a view of seal 514 and seal 516 within the box labeled FIG. 8 shown in FIG. 5.

The different components shown in FIGS. 1 and 3-10 may be combined with components in FIG. 2, used with components in FIG. 2, or a combination of the two. Additionally, some of the components in FIGS. 1 and 3-10 may be illustrative examples of now components shown in block form in FIG. 2 may be implemented as physical structures.

The diagrammatic representation of aerial refueling environment 200 in FIG. 2, the refueling receptacle depictions in FIGS. 3-8, and aerial refueling environment depiction in FIG. 1 are not meant to imply physical or architectural limitations to the manner in which an illustrative embodiment may be implemented. Other components in addition to or in place of the ones illustrated may be used. Some components may be unnecessary. Also, the blocks of FIG. 2 are presented to illustrate some functional components. One or more of these blocks may be combined, divided, or combined and divided into different blocks when implemented in an illustrative embodiment.

For example, refueling system 210 may include additional structures in addition to refueling receptacle 212. Refueling system 210 may also include piping, a number of pumps, a number of tanks, a number of valves, or other desirable structures in addition to refueling receptacle 212. In another example, refueling receptacle 212 may include additional features not shown in FIG. 2. Refueling receptacle 212 may also include a housing, a number of fasteners, a number of toggle actuators, a number of refueling boom interface components, or other desirable structures.

Figure 9:
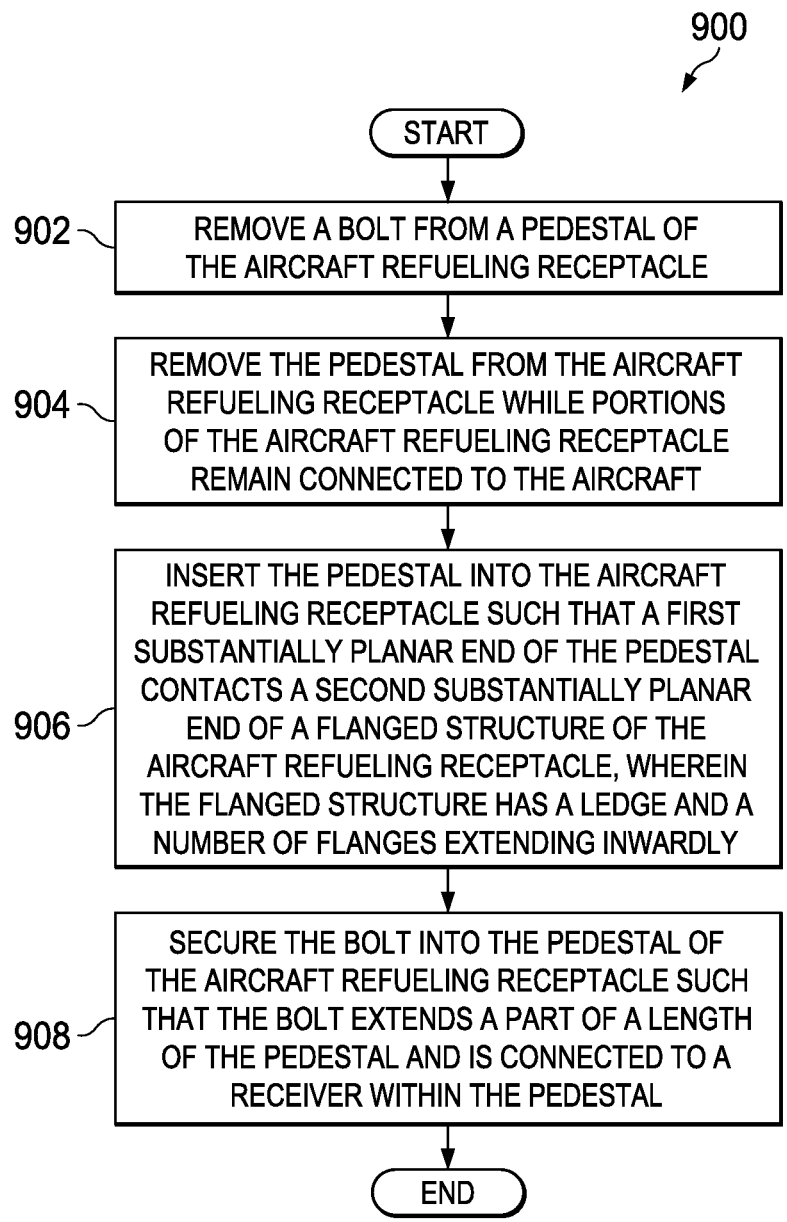
FIG. 9 is a flowchart of a method of performing maintenance on an aircraft refueling receptacle without removing the entire aircraft refueling receptacle from an aircraft in accordance with an illustrative embodiment.

Turning now to FIG. 9, an illustration of a flowchart of a method of performing maintenance on an aircraft refueling receptacle without removing the entire aircraft refueling receptacle from an aircraft is depicted in accordance with an illustrative embodiment. Method 900 may be performed on refueling receptacle 212 of FIG. 2. In some illustrative examples, method 900 may be performed on refueling receptacle 300 of FIGS. 3-8. Method 900 may begin by removing a bolt from a pedestal of an aircraft refueling receptacle (operation 902). For example, bolt 252 may be removed from pedestal 218 through boom cavity 214 of FIG. 2. As another example, bolt 520 may be removed from pedestal 508 through boom cavity 302 of refueling receptacle 300 as depicted in FIG. 5.

Method 900 may then remove the pedestal from the aircraft refueling receptacle while portions of the aircraft refueling receptacle remain connected to the aircraft (operation 904). For example, pedestal 508 may be removed through boom cavity 302 of refueling receptacle 300 while housing 502 of FIG. 5 remains connected to an aircraft.

Method 900 may also insert the pedestal into the aircraft refueling receptacle such that a first substantially planar end of the pedestal contacts a second substantially planar end of a flanged structure of the aircraft refueling receptacle, wherein the flanged structure has a ledge and a number of flanges extending inwardly (operation 906). The flanged structure may be flanged structure 510 of FIG. 5. As can be seen from FIG. 5, substantially planar first end 526 contacts substantially planar second end 528. By first end 526 contacting second end 528, pedestal may be placed in substantially the same location each time following maintenance.

Method 900 may then secure the bolt into the pedestal of the aircraft refueling receptacle such that the bolt extends a part of a length of the pedestal and is connected to a receiver within the pedestal (operation 908). By securing the bolt into the pedestal, the refueling receptacle may be assembled. Securing the bolt into the pedestal may only be done after all components of the refueling receptacle are replaced. Afterwards the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

For example, instead of replacing the same pedestal into the aircraft refueling receptacle, the pedestal may be replaced with a new or replacement refueling receptacle. As another example, additional components of refueling receptacle 300 may be removed through boom cavity 302. Some of the components removed through boom cavity 302 may be re-installed. Some of the components may be removed through boom cavity 302 and replaced with new components. In some illustrative examples, a number of seals such as seals of sealing system 701 may also be removed. For example, a first seal may be removed from the refueling receptacle and replaced with another seal during service and maintenance.

Figure 10:
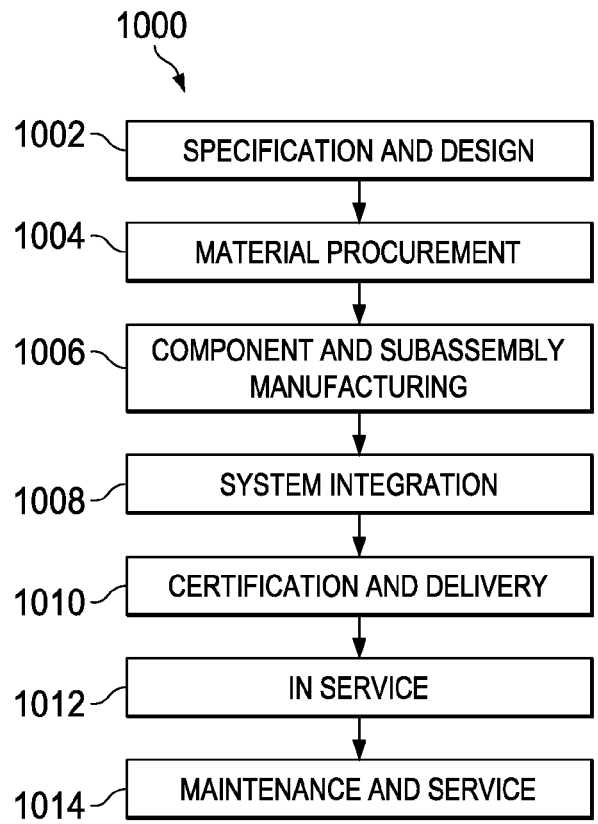
FIG. 10 is a block diagram of an aircraft manufacturing and service method in accordance with an illustrative embodiment.
Figure 11:
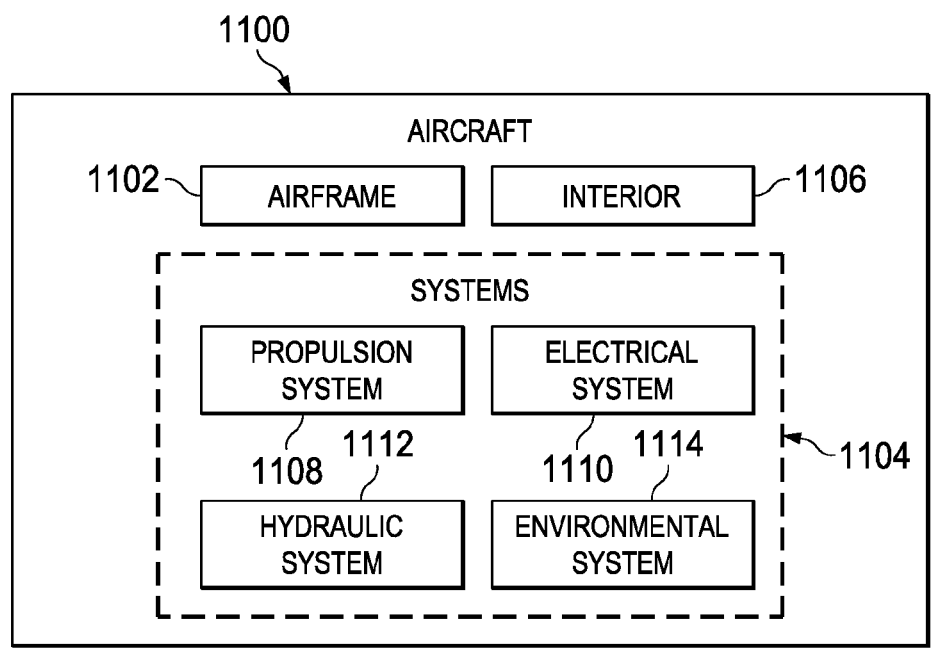
FIG. 11 is a block diagram of an aircraft in accordance with an illustrative embodiment.

The illustrative embodiments of the disclosure may be described in the context of aircraft manufacturing and service method 1000 as shown in FIG. 10 and aircraft 1100 as shown in FIG. 11. Turning first to FIG. 10, a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1000 in FIG. 10.

One or more illustrative embodiments may be used during manufacturing and service method 1000 of FIG. 10. For example, refueling receptacle 212 may be installed in receiving aircraft 204 during component and subassembly manufacturing 1006. Further, pedestal 218, seal 234, flanged structure 220, and seal 240 may replace conventional components to retrofit a pre-existing refueling receptacle during maintenance and service 1014.

The aircraft refueling receptacle of the illustrative embodiments provides a refueling receptacle which may receive at least 1,200 gallons of fuel per minute. Further, the illustrative embodiments provide a refueling receptacle which does not require adjustment following maintenance. For example, first end 244 of pedestal 218 may allow for pedestal 218 to contact second end of flanged structure 220 to have a substantially constant position of pedestal 218 within the refueling receptacle. As a result, maintenance time may be reduced. Further, as a result, the stroke of the refueling receptacle may be substantially constant. Yet further, as a result, the refueling receptacle may have a desired flow rate.

The illustrative embodiments provide components that may be used to retrofit a pre-existing refueling receptacle. Further, refueling receptacle 212 may allow for maintenance of refueling receptacle 212 without removal of refueling receptacle 212 from receiving aircraft 204. Components of refueling receptacle 212, such as at least one of pedestal 218, seal 234, or seal 240 may be removed through boom cavity 214 of refueling receptacle 212.

The aircraft refueling receptacle may reduce costs associated with fueling. The aircraft refueling receptacle may reduce the time required to refuel a receiving aircraft. Further, the aircraft refueling receptacle may allow for lowered risk to the respective aircrafts and operators by lowering the time required to refuel a receiving aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft refueling receptacle that comprises: a pedestal;
   a flanged structure that comprises: a first ledge, a second ledge, and a number of flanges extending inwardly, wherein the pedestal contacts the first ledge;
   a sliding valve that comprises: a first face configured to contact the second ledge of the flanged structure during refueling;
   a bolt configured to:
      extend a part of a length of the pedestal; and
      connect to a receiver within the pedestal; and
   the receiver, wherein the receiver extends through the flanged structure and a portion of the pedestal, the receiver having a cavity configured to receive a threaded portion of the bolt and a shaft extending through the flanged structure, wherein the receiver is configured to be held relative to the flanged structure using a fastener.

2. The aircraft refueling receptacle of claim 1, wherein the bolt is configured to be removed to allow replacement of at least one of: a seal, or a moving part of the aircraft refueling receptacle through a boom cavity, without removing the aircraft refueling receptacle.

3. The aircraft refueling receptacle of claim 1, wherein the aircraft refueling receptacle has a substantially constant stroke.

4. The aircraft refueling receptacle of claim 1, wherein the aircraft refueling receptacle is configured to receive at least 1,200 gallons of fuel per minute.

5. The aircraft refueling receptacle of claim 1 further comprising: a
   seal configured to conform to a surface of the pedestal.

6. An aircraft refueling receptacle that comprises:
   a pedestal;
   a flanged structure that comprises: a first ledge, a second ledge, and a number of flanges that extend inwardly, wherein the pedestal contacts the first ledge, and wherein a portion of the pedestal surrounds a flange of the number of flanges such that the flange centers the pedestal within the aircraft refueling receptacle; and
   a sliding valve that comprises a first face configured to contact the second ledge of the flanged structure during refueling.

7. The aircraft refueling receptacle of claim 6, wherein the sliding valve is associated with a seal having a recessed design.

8. The aircraft refueling receptacle of claim 6, wherein the aircraft refueling receptacle is configured to receive at least 1,200 gallons of fuel per minute.

9. The aircraft refueling receptacle of claim 6, wherein the aircraft refueling receptacle has a substantially constant stroke.

10. The aircraft refueling receptacle of claim 6, wherein the pedestal comprises a first substantially planar end, such that the first ledge forms a second substantially planar end, and wherein the first substantially planar end contacts the second substantially planar end.

11. The aircraft refueling receptacle of claim 6, further comprising: a seal configured to conform to a surface of the pedestal.

12. An aircraft refueling receptacle that comprises:
   a pedestal that comprises a first substantially planar end;
   a flanged structure that comprises: a second substantially planar end, a ledge, and a number of flanges extending inwardly, in which the first substantially planar end of the pedestal contacts the second substantially planar end, in which the second substantially planar end extends circumferentially about a flange of the number of flanges, and in which the flange extends into the pedestal;

a sliding valve associated with a seal, such that the sliding valve comprises a first face that contacts the ledge of the flanged structure during refueling, and wherein the seal associated with the sliding valve comprises a recessed design; and a bolt configured to:
extend a part of a length of the pedestal; and connect to a receiver within the pedestal.

13. The aircraft refueling receptacle of claim 12, further comprising:
the receiver, wherein the receiver extends through the flanged structure and a portion of the pedestal, and wherein a channel in the receiver is configured to receive a threaded portion of the bolt.

14. The aircraft refueling receptacle of claim 12, wherein the aircraft refueling receptacle is configured to receive at least 1,200 gallons of fuel per minute.

15. The aircraft refueling receptacle of claim 12, wherein the aircraft refueling receptacle has a substantially constant stroke.

16. The aircraft refueling receptacle of claim 12, wherein the aircraft refueling receptacle has a consistent stroke with refueling receptacles of a same design.

17. A method of performing maintenance on an aircraft refueling receptacle without removing the entire aircraft refueling receptacle from an aircraft, the aircraft refueling receptacle comprising a sliding valve having a first face configured to contact a ledge of a flanged structure during refueling, the method comprising:

removing a bolt from a pedestal of the aircraft refueling receptacle;

removing the pedestal from the aircraft refueling receptacle while portions of the aircraft refueling receptacle remain connected to the aircraft;

inserting the pedestal into the aircraft refueling receptacle such that a first substantially planar end of the pedestal contacts a second substantially planar end of the flanged structure of the aircraft refueling receptacle, the flanged structure comprising the ledge and a number of flanges extending inwardly, wherein inserting the pedestal into the aircraft refueling receptacle comprises slipping a portion of the pedestal over a flange of the number of flanges such that the portion surrounds the flange; and securing the bolt into the pedestal of the aircraft refueling receptacle with the bolt extending a part of a length of the pedestal and connecting to a receiver within the pedestal, wherein the receiver extends through the flanged structure and a portion of the pedestal, the receiver having a cavity configured to receive a threaded portion of the bolt and a shaft extending through the flanged structure, wherein the receiver is configured to be held relative to the flanged structure using a fastener.

* * * * *